United States Patent [19]
Gonzalez et al.

[11] 3,825,931
[45] July 23, 1974

[54] PHASE FRONT DETECTION SYSTEM

[75] Inventors: Robert E. Gonzalez, Tampa; Harry F. Strenglein, Clearwater, both of Fla.

[73] Assignee: Sperry Rand Corporation, New York, N.Y.

[22] Filed: Aug. 1, 1972

[21] Appl. No.: 277,005

[52] U.S. Cl............................. 343/100 AP, 325/67
[51] Int. Cl........................................ G01r 29/10
[58] Field of Search....... 343/100 AP, 18 D; 325/67

[56] References Cited
UNITED STATES PATENTS
2,548,836  4/1951  Worthington, Jr. .......... 343/100 AP
3,108,275  10/1963  Chisholm ......................... 343/18 D
3,357,014  12/1967  Atlas ............................. 343/100 AP OTHER PUBLICATIONS
Proceedings of the I.R.E., December 1947, pp. 1,451–1,455 relied on.

*Primary Examiner*—Maynard R. Wilbur
*Assistant Examiner*—Richard E. Berger
*Attorney, Agent, or Firm*—Howard P. Terry

[57] ABSTRACT

The invention is an improved arrangement for the detection of the location of the phase front of a signal emitted by a large aperture antenna by employment of a reflecting test device comprising a cyclically varied impedance.

2 Claims, 3 Drawing Figures

PHASE FRONT DETECTION SYSTEM

BACKGROUND OF THE INVENTION

1. Field of the Invention

The invention pertains to precision measurement of antenna characteristics and more particularly relates to stable apparatus for the investigation of the fields of large aperture antennas for enabling the precise measurement and plotting of radiation phase fronts.

2. Description of the Prior Art

In the prior art, investigation of the high frequency phase front of large aperture antennas has been accomplished, as will be discussed in connection with FIG. 1, by comparing the phases of high frequency energy fed into the antenna under test with the phase of the radiated field at a remote sampling site. Such arrangements have required a length of transmission line between the location of the antenna under test and the remote site. Dimensional instabilities of such transmission lines have been found to seriously degrade accuracy of measurement.

SUMMARY OF THE INVENTION

The invention overcomes the need for use of unreliable transmission lines required in the prior art system for the location of the phase front of a signal propagating from a large aperture antenna by employing a cyclically altered reflection device in the propagation path of the antenna under test.

DESCRIPTION OF THE PREFERRED EMBODIMENTS

Figure 1:
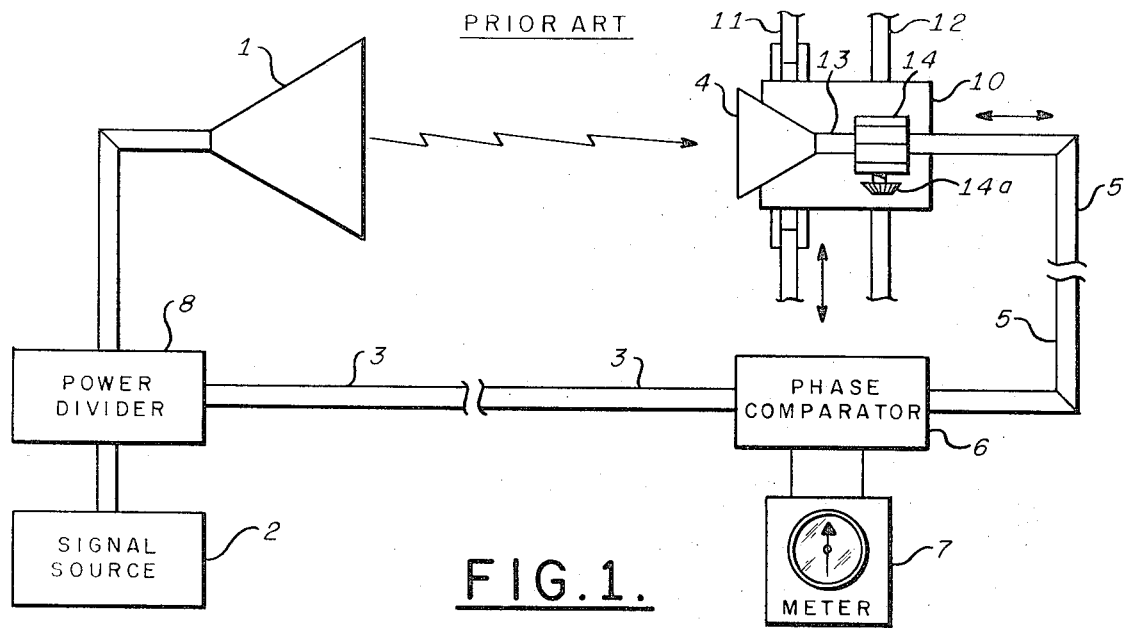
FIG. 1 is a partial plan view of the prior art device for examining the phase front of an antenna.

FIG. 1 illustrates the prior art arrangement for the measurement of the phase front of a signal emitted by a conventional large-aperture antenna 1, which antenna may take any of various forms, such as a multi-element array, a pyramidal horn, or a paraboloid illuminated by a transmission line feed. Such measurements of phase front may be required to assure proper focussing of an antenna in its development where a very large antenna test field of size commensurate with the antenna's large field of depth is not available. Convenience in making antenna phase front measurements is desired both in the development and in the maintenance of large aperture antennas. For example, it may be desired quickly to identify defective sections of a phased array antenna without the availability of a conventional test site.

In past practice, the antenna 1 to be tested was excited from a conventional high frequency signal source 2, part of the power from source 2 being supplied by power divider 8 over a transmission line 3 to a remote test station. The radiation from anetnna 1 was sampled at various locations at the test station by a small standard horn antenna 4 and was supplied to a transmission line 5. Measurements were made by supplying signals over transmission lines 3 and 5 to a conventional high frequency phase comparator 6 connected to a zero-center meter 7 as a display for example.

To effect such measurements, the sampling standard antenna 4 may be moved at right angles to the axis of antenna 1 on a suitable platform 10 placed on an ordinary carriage adapted to be moved, for example, on rails 11 and 12. The axial position of sampling antenna 4 may be adjusted by loosening screw 14a of clamp 14 mounted on platform 10 so that transmission line section 13 and the antenna 4 it supports can be moved toward or away from antenna 1. By moving antenna 4 transversely and axially in steps with respect to the axis of antenna 1, successive readings of meter 7 may be nulled and the wave front position or contour of antenna 1 thus plotted.

The prior art arrangement of FIG. 1 is feasible only if transmission lines 3 and 5, or at least transmission line 5, is flexible at least to a degree, since test antenna 4 must be moved over an appreciable area in front of antenna 1. For reasonable accuracy to be afforded, lines 3 and 5 must nevertheless have a fixed length. The effective changes in length of lines 3 and 5 must evidently be very small in comparison to the desired measurement accuracy expected by the viewer of meter 7.

The types of flexible transmission line cable readily available on the market are not sufficiently stable dimensionally at high frequencies for providing fully accurate results. Alternative arrangements using lengths of rigid lines with rotary joints interposed between them are expensive and highly vulnerable to damage. The rotary joints themselves impose an undesirably low limitation on measurement accuracy.

Figure 2:
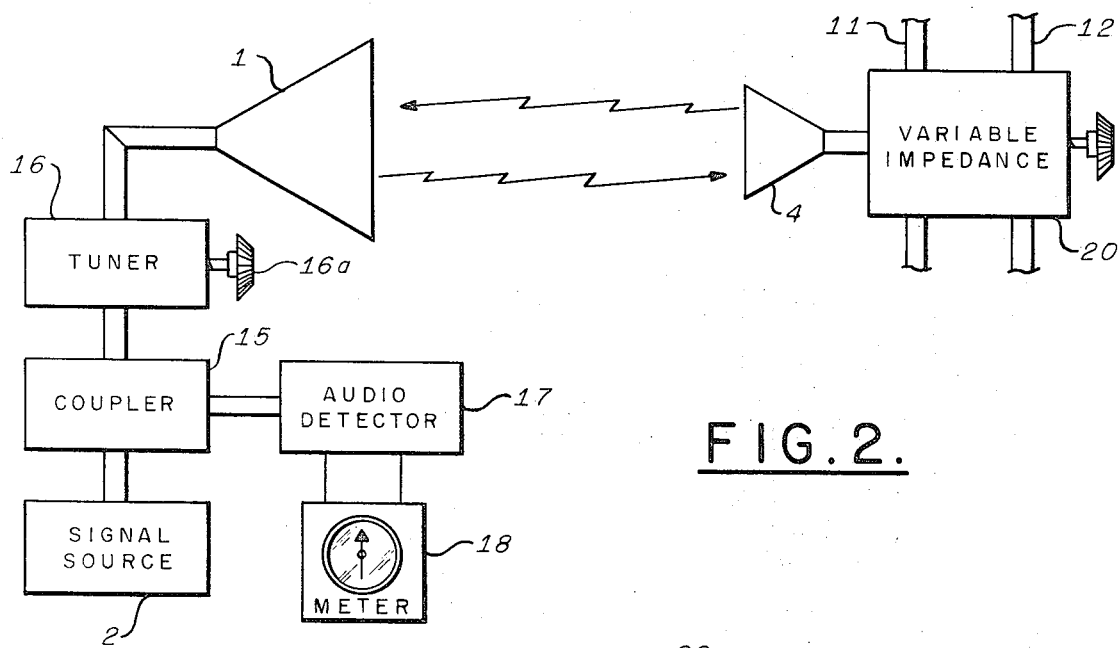
FIG. 2 is a similar view of the apparatus of the invention.

According to the present invention, as illustrated in FIG. 2, a means for providing the desired measurement facility is afforded without requiring the use of long interconnecting transmission lines with their attendant phase instability characteristics. In FIG. 2, the antenna 1 under test and the sampling antenna 4 are similar to their counterparts in FIG. 1. In FIG. 2, the carrier frequency output of signal source 2 is fed through the series connected coupler 15 and adjustable tuner 16, if the latter is needed, to be radiated toward the remote test site by antenna 1. A third or output port of coupler 15 is connected to a conventional audio modulation detector 17 thence to the aduio amplitude meter or display 18, which may be a cathode ray or other indicator device, if desired.

According to the invention, the remote test location is again provided with a sampling antenna 4 which may be adjusted in position along two axes relative to antenna 1 by orthogonal motions relative to positional indices such as rails 11, 12. Antenna 4 is connected to the platform-mounted variable impedance device 20; device 20 may be any of several well known adjustable or electrically variable impedance devices, as will be discussed. It will be seen that device 20 determines the amount of high frequency energy reflected by antenna 4 into antenna 1.

Figure 3:
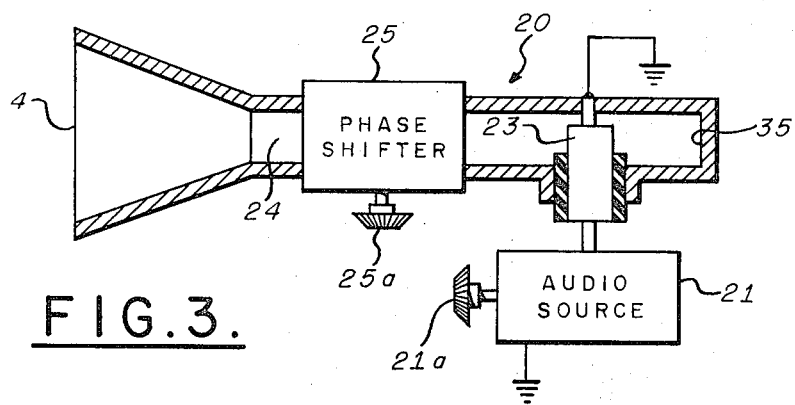
FIG. 3 is a view, partly in cross section, of the variable impedance device used in FIG. 2.

The sampling antenna 4 and variable impedance reflective element 20 may take the form of the arrangement illustrated in FIG. 3. The device of FIG. 3 is provided with means such that the carrier high frequency signal directed toward it by the antenna 1 under test is, for example, sinusoidally modulated before reflection toward antenna 1 by an audio wave originated by audio source 21. The effective imepdance of element 20 is thus varied at a suitable rate by applying the output of audio bias current source 21 to a variable control element in the form of a diode 23. Diode 23 is connected between audio source 21 and ground and is located in the usual manner, such as transverse of a wave guide 24 at a quarter wave distance from the fixed wave guide reflecting short 35. Didoe 23 may be any type of semiconductor or other diode which may readily be coupled to transmission line 24. For example, diode 23 may be matched to transmission line 24 for some particular value of biasing current flowing from audio source 21 through diode 23. Because of the non-linear characteristics of diode 23, the effective impedance of transmission line 24 may thus be cyclically altered by the corresponding current forced through diode 23 by audio soruce 21. Such operation produces an apparent corresponding cyclic or other variation in the apparent scattering cross section of reflector antenna 4 in the well known manner.

As noted previously, the apparatus of FIG. 3 may be mounted on a platform movable on the tracks 11, 12 of FIG. 2, which arrangement allows sampling antenna 4 to be positioned mechanically anywhere in the plane in which the phase front measurement is desired. Provision is again made as in FIG. 1 to move the sampling antenna 4 actually or in effect along the direction of signal propagation from antenna 1. For example, a calibrated transmission line phase shifter 25 may be inserted in transmission line 24 between the sampling antenna 4 and diode 23 and its insertion phase may be determined in the usual manner by adjustment of control 25a. Furthermore, coarse adjustment may be made by moving antenna 4 along the direction of propagation of energy from antenna 1 and fine adjustment by the operation of phase shifter 25.

As previously noted, the feed transmission line of antenna 1 is coupled to a signal source 2 operating at the will of the operator at a selected test carrier frequency through a triple port coupler 15 of the conventional bilateral type which is adapted to supply samples of both incident and reflected energy to audio detector 17. A simple capactive or inductive device may be employed as coupler 15. In the case that preferential coupling to the reflected signal is wanted because of the presence of large attenuation, a conventional circulator or directional coupler may be used. In the latter instance, an adjustable tuner or impedance matching transformer 16 may be placed between coupler 15 and antenna 1, thus assuring that a sufficient level of the incident signal from signal source 2 is directed toward the diode of audio detector 17 for heterodyning purposes. The detected output of circuit 17 is coupled to indicator 18, which may be an oscilloscope, voltmeter, or other display instrument capable of responding to the frequency of the audio source 21 of the remote site. If improved sensitivity is desired, indicator 18 may be a tuned or narrow band device.

In operation of the apparatus of FIGS. 2 and 3, it is seen that the radiation pattern phase front of antenna 1 may again be derived, but without the need for the use of long transmission lines with their inherent lack of dimensional stability. The test antenna 4 and its variable impedance 20 may be moved from point-to-point across the area in front of antenna 1, antenna 4 being moved axially or with adjustment of phase shifter 25, if desired, to provide nulls in the detection of the time varying reflected signal as observed on meter 18. Whenever the phase in degrees of the high frequency signal at the third port of the coupler 11 is $n\, 180 + 90$, $n$ being an integer, a null is presented on meter 18. Consequently, if the fore-aft motion of unit 20 (or the setting of phase shifter 25) necessary to track such a null is noted as unit 20 is moved about in the volume before the antenna aperture, the complete phase front of antenna 1 may readily be plotted.

It is seen that measurements made according to the invention are made over a two way free space path with reference to a readily identifiable time varying reflection and that they are independent of the phase stability characteristics, for example, of flexible cable transmission line, the initial cost and cost of handling of which is also avoided. No physical high frequency connections are needed and the measurement accuracy is independent of the phase of variation of the variable impedance device 20. It has further been found that the antenna under test need not be in a reflectionless environment, as long as the summation of such reflections is relatively stable. The technique is applicable in the region between an antenna under test and a test antenna in which the power transfer between the antennas is substantially independent of range, thus a large antenna test range is not used or required in practicing the invention. While the invention has been discussed in terms of tracking a null to obtain phase front information, the invention may be used for other purposes. For example, the maximum reading obtained by shifting the phase shifter 25 may be used to determine amplitude taper data directly, a result not available with the prior art configuration of FIG. 1. Accordingly, the invention is a highly useful tool in the development, inspection, and maintenance of large aperture antennas whose properties are not readily checked by prior art means.

While the invention has been described in its preferred embodiments, it is to be understood that the words which have been used are words of description rather than of limitation and that changes within the purview of the appended claims may be made without departure from the true scope and spirit of the invention in its broader aspects.

We claim:

1. Apparatus for investigation of the phase front of an antenna under test comprising:
   carrier frequency signal source means connected to said antenna under test for exciting said phase front,
   cyclically variable reflecting impedance means adapted to be placed at selected locations adjacent said phase front for cyclically modulating and reflecting toward said antenna under test carrier frequency signals,
   coupler means having first and second ports connected in series relation between and responsive both to said carrier frequency source means and to said antenna under test and having third port means for providing an output,
   signal detector means responsive to said third port means for displaying the amplitude of said reflected modulated carrier frequency signal,
   said coupler means being adapted to supply through said third port means to said signal detector means both said carrier frequency signal from said carrier frequency signal source means and said reflected modulated carrier frequency signal, said coupler means being connected in series relation with said antenna under test through adjustable tuner means for adjustably matching said coupler means to said antenna under test, and means for adjusting the effective location of said cyclically variable reflecting impedance means with respect to said phase front for nulling said amplitude display.

2. Apparatus for investigation of the phase front of an antenna under test comprising:

carrier frequency signal source means connected to said antenna under test for exciting said phase front, cyclically variable reflecting impedance means adapted to be placed at selected locations adjacent said phase front for cyclically modulating and reflecting toward said antenna under test carrier frequency signals including means for adjusting the effective location of said cyclically variable reflecting impedance means with respect to said phase front for nulling amplitude display means, said cyclically variable reflecting impedance means including:

sampling antenna means, transmission line means responsive to said sampling antenna means, reflector means for shorting said transmission line means at an end thereof remote from said sampling antenna means, adjustable impedance diode means coupled to cyclic bias current means for varying the reflectivity of said reflector means, and adjustable phase shifter means disposed in series relation within said transmission line means with said sampling antenna means and said adjustable impedance means, and coupler means having first and second ports connected in series relation between the responsive both to said carrier frequency source means and to said antenna under test, said coupler means having third port means for providing an output, and signal detector means responsive to said third port means for displaying the amplitude of said reflected modulated carrier frequency signal.

* * * * *